(12) United States Patent
Huh et al.

(10) Patent No.: US 9,037,848 B2
(45) Date of Patent: May 19, 2015

(54) MOBILE IPTV SERVICE SYSTEM USING DOWNLOADABLE CONDITIONAL ACCESS SYSTEM AND METHOD THEREOF

(71) Applicant: Intellectual Discovery Co., Ltd., Seoul (KR)

(72) Inventors: Eui Nam Huh, Gyeonggi-do (KR); Young Rok Shin, Gyeonggi-do (KR)

(73) Assignee: Intellectual Discovery Co., Ltd., Seoul (KR)

( * ) Notice: Subject to any disclaimer, the term of this patent is extended or adjusted under 35 U.S.C. 154(b) by 251 days.

(21) Appl. No.: 13/624,345

(22) Filed: Sep. 21, 2012

(65) Prior Publication Data

US 2013/0156187 A1  Jun. 20, 2013

(30) Foreign Application Priority Data

Dec. 19, 2011  (KR) .................. 10-2011-0137624
Feb. 10, 2012  (KR) .................. 10-2012-0013960

(51) Int. Cl.
| | |
|---|---|
| *H04L 9/08* | (2006.01) |
| *H04L 29/06* | (2006.01) |
| *H04N 21/2347* | (2011.01) |
| *H04N 21/258* | (2011.01) |
| *H04N 21/266* | (2011.01) |
| *H04N 21/414* | (2011.01) |
| *H04N 21/4405* | (2011.01) |
| *H04N 21/4623* | (2011.01) |

(Continued)

(52) U.S. Cl.
CPC .......... *H04L 63/0823* (2013.01); *H04L 9/0816* (2013.01); *H04L 63/0884* (2013.01); *H04N 21/2347* (2013.01); *H04N 21/25875* (2013.01); *H04N 21/26606* (2013.01); *H04N 21/26613* (2013.01); *H04N 21/41407* (2013.01); *H04N 21/4405* (2013.01); *H04N 21/4623* (2013.01); *H04N 21/63345* (2013.01); *H04N 21/64322* (2013.01)

(58) Field of Classification Search
CPC ..... H04L 9/0816; H04L 9/83; H04L 63/0823; H04L 63/0884
See application file for complete search history.

(56) References Cited

U.S. PATENT DOCUMENTS

| | | | |
|---|---|---|---|
| 2009/0141901 A1* | 6/2009 | You et al. ...................... | 380/277 |
| 2009/0144539 A1* | 6/2009 | Jeong et al. ................... | 713/155 |

(Continued)

OTHER PUBLICATIONS

Alsaffar, et al. "Secure migration of IPTV services from a STB to mobile devices for pay per view video." Digital Content, Multimedia Technology and its Applications (IDC), 2010 6th International Conference on. IEEE, Aug. 16-18, 2010.*

(Continued)

*Primary Examiner* — Jung Kim
*Assistant Examiner* — Robert Leung
(74) *Attorney, Agent, or Firm* — Rothwell, Figg, Ernst & Manbeck, P.C.

(57) ABSTRACT

An apparatus and method associated with an Internet Protocol Television (IPTV) service in a mobile environment are provided. A streaming server may provide a mobile terminal with a mobile certificate and an encryption key. In response to a content request received from the mobile terminal, the streaming server may provide the mobile terminal with encrypted content and a Downloadable Conditional Access System (DCAS) code. The mobile terminal may decrypt the encrypted content using the encryption key and the DCAS code, and may play back the decrypted content.

14 Claims, 5 Drawing Sheets

(51) Int. Cl.
*H04N 21/6334* (2011.01)
*H04N 21/643* (2011.01)

(56) References Cited

U.S. PATENT DOCUMENTS

2009/0144541 A1* 6/2009 Kim et al. .................. 713/156
2010/0161966 A1* 6/2010 Kwon et al. ................ 713/155
2011/0213976 A1* 9/2011 Ryou et al. ................. 713/169

OTHER PUBLICATIONS

Borza, et al. "The Future of Open Cable Systems: Conditional Access Migrates to DCAS," Information Quarterly, vol. 7, No. 2, 2008.*

Aymen Abdullah Alsaffar and Eui-Nam Huh; Secure Migration Service for Mobile IPTV using DCAS; Science Alert; Sep. 23, 2011; 9 pages.

* cited by examiner

MOBILE IPTV SERVICE SYSTEM USING DOWNLOADABLE CONDITIONAL ACCESS SYSTEM AND METHOD THEREOF

TECHNICAL FIELD

The present invention relates to an Internet Protocol Television (IPTV) service in a mobile environment, and more particularly, to an apparatus and method for managing user authentication and security and providing a service.

BACKGROUND ART

As a communication speed of the Internet increases, and as population using the Internet increases, a demand for Internet broadcasting that provides a one-source multi-service is increasing.

An Internet Protocol Television (IPTV) service is one of various broadcasting services based on the Internet.

The IPTV service refers to a service of providing information, such as video content, real-time broadcasts, and the like, through televisions (TVs) using high-speed Internet. The IPTV service may be regarded as a type of a digital convergence, namely, as a fusion between the Internet and TVs.

Since the IPTV service provides broadcasting content, such as video and the like, there is no great difference between the IPTV service and general cable broadcasting or satellite broadcasting. A key feature of the IPTV service is that a leadership to watch broadcasting is assigned to viewers, by adding a bidirectional characteristic to enable a viewer to view only a program the viewer desires to watch at a time that is convenient for the viewer.

With development of a technology of IPTVs (*IPTV services, a new service using a wireless network has been attempted, instead of an existing service using a wired network of a service provider. An IPTV service using a wireless network is called an 'IPTV2.0 service,' or a 'mobile IPTV service.'

Due to advent of a mobile IPTV service, service users increasingly require an existing IPTV service through personal mobile terminals. Additionally, researches on the mobile IPTV service have been actively conducted due to an effort to provide an IPTV service through a released mobile terminal. The mobile terminal may be used by various users, and may include, for example a smartphone, a tablet personal computer (PC), and the like.

A mobile IPTV service may have different requirements from an existing IPTV service. For example, a mobile IPTV service based on a current network needs to meet the following five requirements: The first requirement is scalable video coding that enables existing IPTV content to be provided with a high definition based on a mobile environment. The second requirement includes a multi-interface requirement, and is consideration on a characteristic of a wireless mobile terminal indicating that the wireless mobile terminal may be utilized in a plurality of wireless networks. The third requirement is smooth communication between a terminal and a network. The fourth requirement is guarantee of a quality of experience and a Quality of Service (QoS). The fifth requirement is a way to deal with a security vulnerability based on a wireless network.

Among several requirements for the mobile IPTV service, a requirement associated with security may be an issue. Applying a security technology of an existing IPTV service using a wired network to the mobile IPTV service without a change may have a large number of restrictions.

A Downloadable Conditional Access System (DCAS) may be used as an IPTV security system that may be applied to a wireless network/mobile environment having a different structure from a wired network environment.

The DCAS was developed to solve issues of a conventional hardware type Conditional Access System (CAS). In this instance, the CAS has issues, such as high costs, inefficient capability to cope with emergency, and the like. The DCAS is a system obtained by developing a CAS using an existing fixed-type smart card to a software download type CAS to efficiently manage viewers.

In association with the DCAS, algorithms for authentication of mobile terminals of users, for example Kerberos, Wireless Transport Layer Security (WTLS) and the like, exist. However, in a mobile environment, mechanisms for user authentication based on the algorithms may authenticate mobile terminals using a complicated procedure. Accordingly, the mechanisms may increase a user access time, and may be inefficient in terms of costs and convenience.

DISCLOSURE OF INVENTION

Technical Goals

An aspect of the present invention provides an apparatus and method for performing an Internet Protocol Television (IPTV) service in a mobile environment, such as authentication service and the like, by using a Downloadable Conditional Access System (DCAS).

Technical Solutions

According to an aspect of the present invention, there is provided a method by which a service providing terminal provides content to a mobile terminal, including: generating a mobile certificate and an encryption key; transmitting, to the mobile terminal, the mobile certificate and the encryption key; receiving, from the mobile terminal, the mobile certificate and a content request; generating a Downloadable Conditional Access System (DCAS) code, based on the mobile certificate; transmitting the DCAS code to the mobile terminal; and transmitting, to the mobile terminal, encrypted content corresponding to the content request, wherein the encrypted content is decrypted by the encryption key and the DCAS code.

The encrypted content may be Internet Protocol Television (IPTV) content, and may be transmitted to the mobile terminal.

The service providing terminal may be an IPTV server.

The encrypted content may be transmitted to the mobile terminal, through real-time streaming.

The method may further include receiving a user authentication request from the mobile terminal, transmitting the user authentication request to an authentication server, and receiving, from the authentication server, user authentication information as a response to the user authentication request.

The mobile certificate and the encryption key may be generated based on the user authentication information.

The authentication server may be operated by a Trusted Third Party (TTP), instead of an operator of the service providing terminal.

The method may further include transmitting the content request to a content server, receiving, from the content server, content corresponding to the content request, and encrypting the content and generating the encrypted content.

The method may further include searching for the content server that stores the content, from among a plurality of content servers.

The receiving of the mobile certificate and the content request, the generating of the DCAS code, the transmitting of the DCAS code to the mobile terminal, and the transmitting of the encrypted content to the mobile terminal may be performed for each of a plurality of content requests.

A plurality of encrypted contents respectively corresponding to the plurality of content requests may be decrypted using a plurality of different DCAS codes corresponding to each of the plurality of encrypted contents, and a single encryption key corresponding to all of the plurality of encrypted contents.

According to an aspect of the present invention, there is provided a service providing terminal, including: a DCAS unit to generate a mobile certificate and an encryption key, to transmit, to a mobile terminal, the mobile certificate and the encryption key, to receive, from the mobile terminal, the mobile certificate and a content request, to generate a DCAS code based on the mobile certificate, and to transmit the DCAS code to the mobile terminal; and a streaming service unit to transmit, to the mobile terminal, encrypted content corresponding to the content request, wherein the encrypted content is decrypted by the encryption key and the DCAS code.

The DCAS unit may receive a user authentication request from the mobile terminal, may transmit the user authentication request to an authentication server, and may receive, from the authentication server, user authentication information as a response to the user authentication request.

The service providing terminal may further include a service management unit to transmit the content request to a content server.

The streaming service unit may receive, from the content server, content corresponding to the content request, may encrypt the content, and may generate the encrypted content.

The service management unit may search for the content server that stores the content, from among a plurality of content servers.

For each of a plurality of content requests, the DCAS unit may receive the mobile certificate and the content request, may generate the DCAS code, and may transmit the DCAS code to the mobile terminal.

The streaming service unit may transmit the encrypted content to the mobile terminal, for each of the plurality of content requests.

Effect of the Invention

According to embodiments of the present invention, it is possible to provide an apparatus and method for performing an Internet Protocol Television (IPTV) service in a mobile environment.

DETAILED DESCRIPTION FOR CARRYING OUT THE INVENTION

Reference will now be made in detail to embodiments of the present invention, examples of which are illustrated in the accompanying drawings, wherein like reference numerals refer to the like elements throughout. The embodiments are described below in order to explain the present invention by referring to the figures.

In the following embodiments, a system for providing an Internet Protocol Television (IPTV) service that may perform authentication through a Trusted Third Party (TTP), by using a Downloadable Conditional Access System (DCAS) in a mobile environment, and a method of providing the IPTV service will be described.

Figure 1:
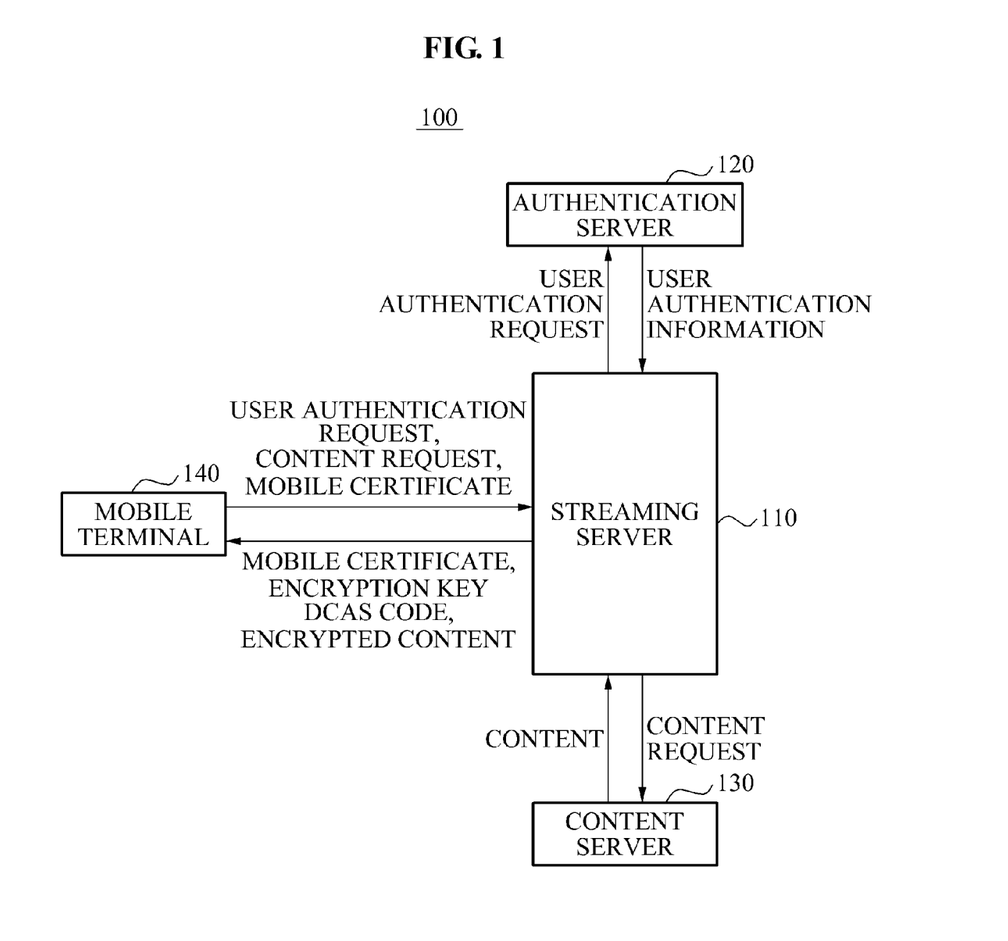
FIG. 1 is a diagram illustrating a configuration of a content providing system according to an embodiment.

FIG. 1 is a diagram illustrating a configuration of a content providing system according to an embodiment.

Figure 2:
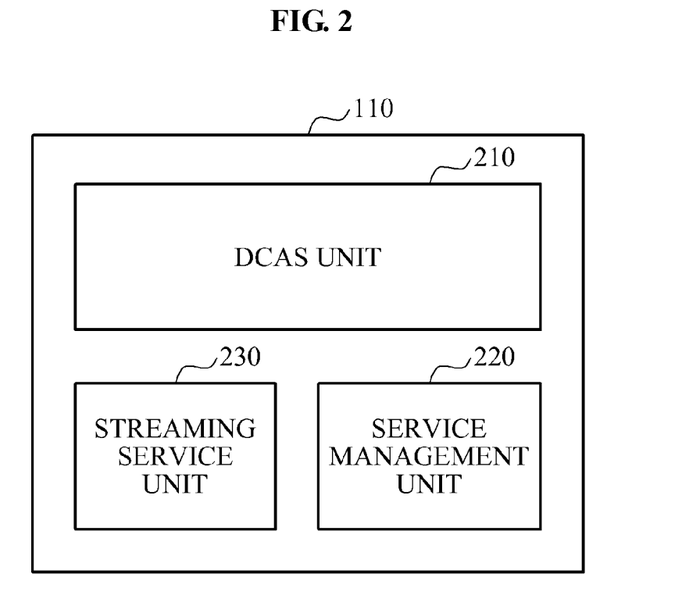
FIG. 2 is a block diagram illustrating a configuration of a streaming server according to an embodiment.

FIG. 2 is a block diagram illustrating a configuration of a streaming server according to an embodiment.

A streaming server 110 may be a service providing terminal to provide a mobile terminal 140 with a service.

A content providing system 100 may be a mobile IPTV service system using a DCAS. The streaming server may be a server of the mobile IPTV service system using the DCAS.

Referring to FIGS. 1 and 2, the content providing system 100 may include the streaming server 110, an authentication server 120, and a content server 130.

The streaming server 110 may be a server operated by a service provider of an IPTV service.

The streaming server 110 may include a DCAS unit 210, a service management unit 220, and a streaming service unit 230.

The authentication server 120, together with the DCAS unit 210 of the streaming server 110, may authenticate the mobile terminal 140 or a user of the mobile terminal 140.

The authentication server 120 may be operated by a TTP, instead of an operator of the streaming server 110. The authentication server 120 may represent a TTP for user authentication. Personal information may be protected, and public confidence and reliability of authentication, and the like may be guaranteed, through the authentication server 120 that is operated by the TTP, independently of a service provider of the streaming server 110.

The content server 130 may store a plurality of contents. The streaming server 110 may transmit a content request to the content server 130. When the content request is received from the streaming server 110, the content server 130 may transmit content corresponding to the content request to the streaming server 110.

Referring to FIG. 2, the streaming server 110 may include the DCAS unit 210, the service management unit 220, and the streaming service unit 230.

The mobile terminal 140 may transmit, to the streaming server 110, a user authentication request, a content request, and a mobile certificate. The mobile terminal 140 may receive, from the streaming server 110, a mobile certificate, an encryption key, a DCAS code, and encrypted content.

The streaming server 110 may transmit a user authentication request to the authentication server 120. The streaming server 110 may receive user authentication information from the authentication server 120.

The streaming server 110 may transmit a content request to the content server 130. The streaming server 110 may receive content from the content server 130.

Hereinafter, an operation of entities in the content providing system 100, and information transmitted between the entities will be described in detail with reference to FIGS. 3 to 5.

Figure 3:
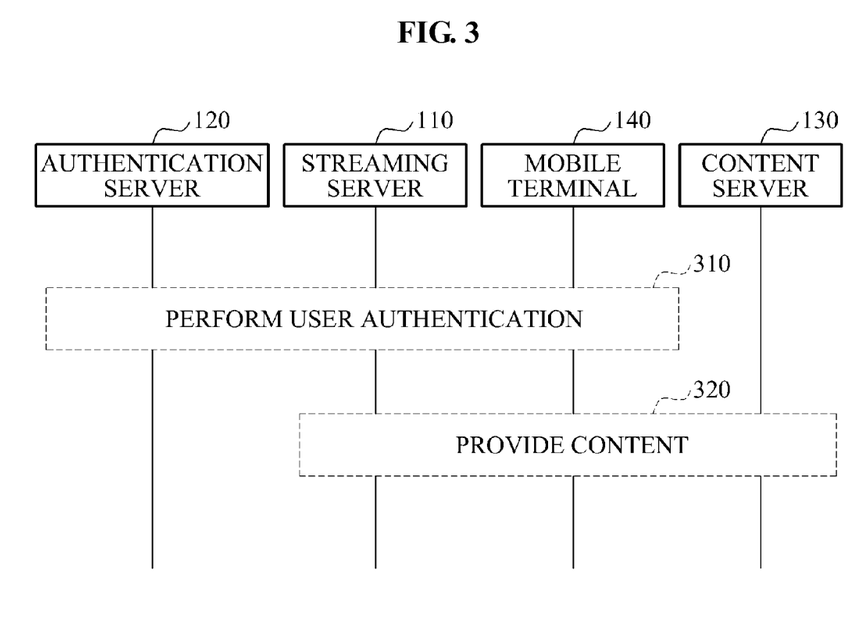
FIG. 3 is a signal flowchart illustrating a method of providing a mobile terminal with content according to an embodiment.

FIG. 3 is a signal flowchart illustrating a method of providing a mobile terminal with content according to an embodiment.

The method may be a mobile IPTV service method using a DCAS. Through the method, the streaming server 120 may provide content to the mobile terminal 140.

In operation 310, the streaming server 110, the authentication server 120 and the mobile terminal 140 may perform a user authentication process to register the mobile terminal 140.

In operation 320, the streaming server 110, the content server 130 and the mobile terminal 140 may provide content to the user of the mobile terminal 140.

Hereinafter, operations 310 and 320 will be described in detail with reference to FIGS. 4 and 5.

Figure 4:
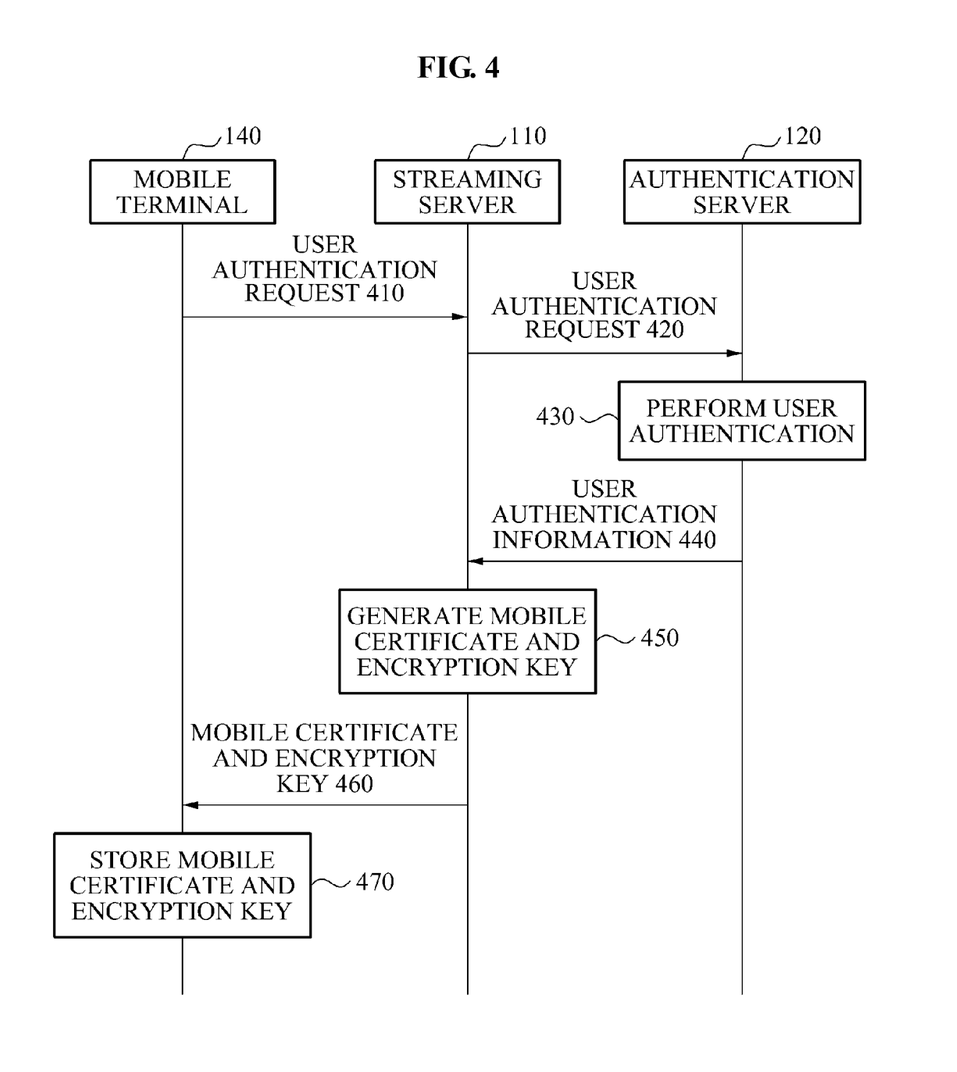
FIG. 4 is a signal flowchart illustrating a user authentication process according to an embodiment.

FIG. 4 is a signal flowchart illustrating a user authentication process according to an embodiment.

Operation 310 may include operations 410 through 470 that will be described below.

In operations 410 through 450 that will be described below, the DCAS unit 210, together with the authentication server 120, may perform user authentication on the mobile terminal 140 or the user of the mobile terminal 140.

In operation 410, the DCAS unit 210 of the streaming server 110 may receive a user authentication request from a nonregistered mobile terminal 140.

In operation 420, the DCAS unit 210 may transmit the received user authentication request to the authentication server 120.

The DCAS unit 210 may transmit, to the authentication server 120, information of the mobile terminal 140 or information of the user of the mobile terminal 140, in addition to the user authentication request. The information of the mobile terminal 140 or the information of the user of the mobile terminal 140 may be stored in the DCAS unit 210.

The authentication server 120 may receive the user authentication request, and the like from the DCAS unit 210.

In operation 430, the authentication server 120 may perform user authentication, in response to the user authentication request.

The authentication server 120 may perform user authentication, based on the information of the mobile terminal 140 or the information of the user of the mobile terminal 140. When the user authentication is performed, the authentication server 120 may register the mobile terminal 140 on the authentication server 120.

Typically, all users' personal information required by the mobile terminal 140 to access the streaming server 110 may be stored in the streaming server 110. For example, when all personal information is stored in a server, a problem of vulnerability of security for the personal information may occur. Conversely, when a part of or all of user authentication is performed through the authentication server 120, a scheme of managing an important part of personal information by using the authentication server 120 that is operated by a TTP, instead of the streaming server 110 may be used. Through the scheme, security for personal information may be provided at a higher level.

The authentication server 120 may generate user authentication information, based on the authentication and registration.

In operation 440, the authentication server 120 may transmit, to the DCAS unit 210, user authentication information as a response to the user authentication request. The DCAS unit 210 may receive, from the authentication server 120, the user authentication information as a response to the user authentication request.

In operation 450, the DCAS unit 210 may generate a mobile certificate and an encryption key. The DCAS unit 210 may generate a mobile certificate and an encryption key, based on the user authentication information received as a response to the user authentication request transmitted by the mobile terminal 140. The DCAS unit 210 may store the user authentication information.

In operation 460, the DCAS unit 210 may transmit, to the mobile terminal 140, the generated mobile certificate and the generated encryption key.

Through the above-described operations 410 through 460, the mobile terminal 140 may be registered on the content providing system 100, the streaming server 110, or the authentication server 120.

In operation 470, the mobile terminal 140 may store the mobile certificate and the encryption key received from the DCAS unit 210. In other words, the mobile terminal 140 may store the encryption key provided by the streaming server 110 through the above-described user authentication process. The mobile certificate may be used for authentication of the mobile terminal 140 and generation of a DCAS code that will be described below. The mobile terminal 140 may use a DCAS code and the encryption key, to decrypt encrypted content that will be described below.

Subsequently, the mobile terminal 140 may be authenticated based on the mobile certificate. When the mobile terminal 140 stores the mobile certificate, a request to authenticate a mobile terminal may not be transmitted to the authentication server 120. Accordingly, a time required to access a content providing service may be shortened, and a cost to transfer a message associated with a content providing service may be reduced. Additionally, a user convenience may be increased.

Figure 5:
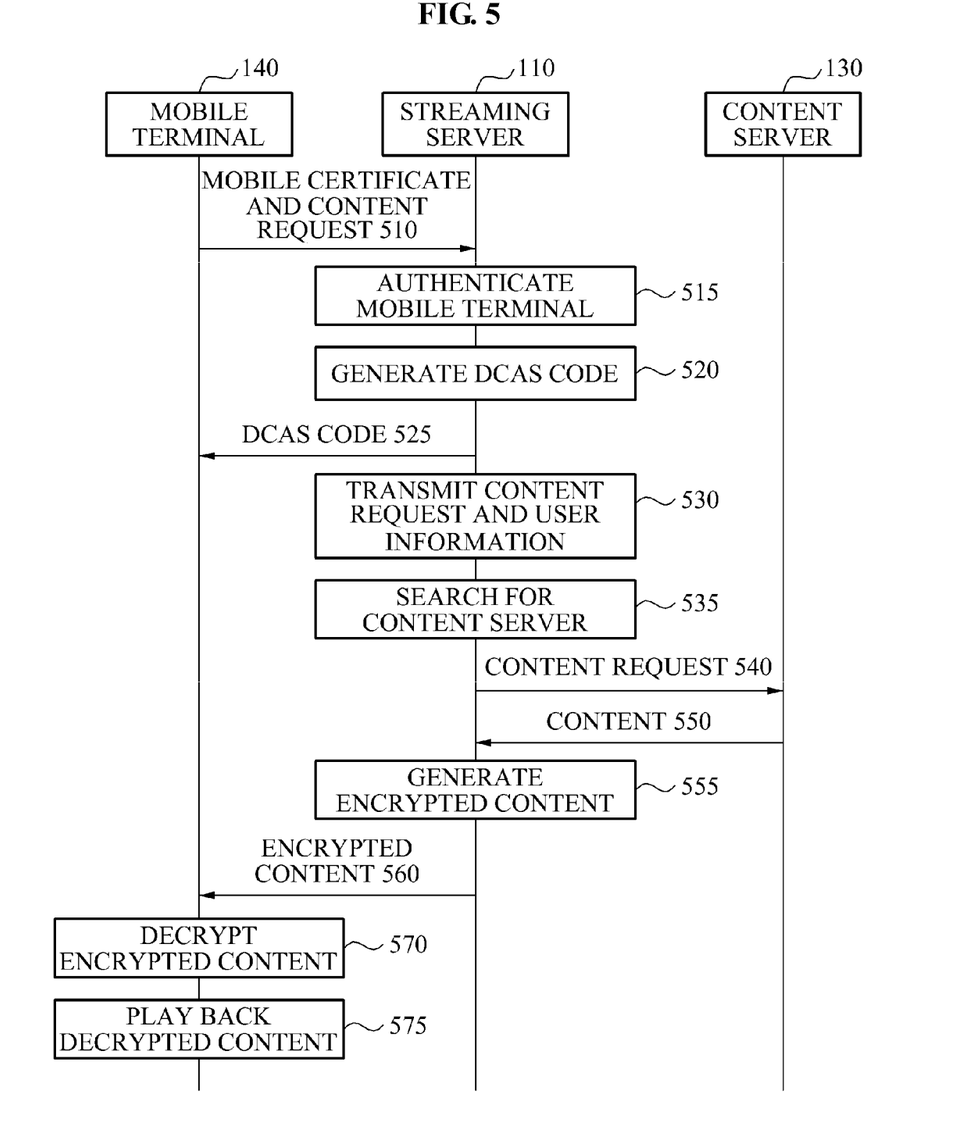
FIG. 5 is a signal flowchart illustrating a content providing process according to an embodiment.

FIG. 5 is a signal flowchart illustrating a content providing process according to an embodiment.

Operation 320 may include operations 510 through 575 that will be described below.

In operation 510, an authenticated mobile terminal 140 may transmit, to the DCAS unit 210, a mobile certificate and a content request. In this instance, the mobile certificate may be the mobile certificate stored in the mobile terminal 140 in operation 470 of FIG. 4. For example, when the mobile terminal 140 accesses the streaming server 110 and requests the streaming server 110 to transmit content, a mobile certificate and a content request may be transmitted to the mobile terminal 140. The mobile certificate may be used for authentication of the mobile terminal 140 and generation of a DCAS code that will be described below.

The DCAS unit 210 may receive, from the mobile terminal 140, the mobile certificate and the content request.

In operation 515, the DCAS unit 210 may authenticate the mobile terminal 140, based on the mobile certificate. The DCAS unit 210 may determine a service suitable for the authenticated mobile terminal 140.

The DCAS unit 210 may determine whether the mobile terminal 140 joins a content providing service, based on the mobile certificate received from the mobile terminal 140, user information stored in the DCAS unit 210, and user authentication information stored in the DCAS unit 210. When the content providing service is enabled to be provided to the mobile terminal 140, operation 520 may be performed.

In operation 520, the DCAS unit 210 may generate a DCAS code, based on the received mobile certificate and the user authentication information.

When the mobile terminal 140 accesses the content providing service, the DCAS unit 210 may generate a software code that is the same as the DCAS code, and may use the generated software code. By generating and using the software code, the DCAS unit 210 may effectively reduce hardware replacement costs based on a module change, compared to an existing hardware-based Conditional Access System (CAS). Additionally, by using the software code, the DCAS unit 210 may safely operate the content providing service via a network, and may prevent an illegal access to the content providing service and hacking into the content providing service. The DCAS unit 210 may change a module through software download via a network. By a function of the DCAS unit 210 as described above, flexibility and simple configuration in the content providing service, in addition to streaming, may be provided.

A newly generated DCAS code may be used, together with an encryption key stored in the mobile terminal 140, to decrypt encrypted content that will be described below. The DCAS code may improve security of content during the content providing process.

In operation 525, the DCAS unit 210 may transmit the generated DCAS code to the mobile terminal 140.

In operation 530, the DCAS unit 210 may transmit the received content request and the user information to the service management unit 220. The service management unit 220 may manage and monitor communication between the mobile terminal 140 and the streaming server 110.

The service management unit 220 may be used to control and monitor a multicast session. The service management unit 220 may manage connection between a user and content, in association with all users using the content providing system 100.

When content requested by the mobile terminal 140 needs to be transferred to the mobile terminal 140, the service management unit 220 may manage all content servers associated with transfer of the content.

In operation 535, the service management unit 220 may search for the content server 130 that stores content corresponding to the received content request and suitable for a user, from among a plurality of content servers, based on the received content request and the user information.

In operation 540, the service management unit 220 may transmit the content request to the content server 130.

In operation 550, the content server 130 may transmit, to the streaming service unit 230, content corresponding to the content request, as a response to the content request.

The streaming service unit 230 may receive the content corresponding to the content request from the content server 130.

In operation 555, the streaming service unit 230 may encrypt the received content, and may generate the encrypted content. In an example, the streaming service unit 230 may encrypt the content, based on the encryption key and the DCAS code that have been described above with reference to FIG. 3. In another example, the streaming service unit 230 may encrypt the content, based on information associated with the encryption key and information associated with the DCAS code. In this instance, the information associated with the encryption key may be another key forming a pair with the encryption key.

The encrypting may prevent a content providing service from being used through an access to content by an illegal user, and through hacking into the content.

The encrypted content may be decrypted by the encryption key and the DCAS code.

In operation 560, the streaming service unit 230 may transmit the encrypted content corresponding to the content request to the mobile terminal 140.

The streaming service unit 230 may transmit, to the mobile terminal 140, the encrypted content as IPTV content. The streaming service unit 230 may transmit the encrypted content to the mobile terminal 140, through real-time streaming.

Streaming may refer to a technology of playing back data in real time while transmitting the data over the Internet.

The mobile terminal 140 may receive the encrypted content from the streaming service unit 230.

In operation 570, the mobile terminal 140 may decrypt the encrypted content.

To decrypt the encrypted content, the mobile terminal 140 may use the DCAS code and the encryption key.

In operation 575, the mobile terminal 140 may play back the decrypted content.

The above-described operation 320 may be repeatedly performed. The mobile terminal 140 may request the streaming server 110 to transmit several contents. In other words, a plurality of content requests may be transmitted in operation 510. For example, operations 510, 520, 525, 560, and the like may be performed for each of the plurality of content requests.

To decrypt a plurality of encrypted contents respectively corresponding to the plurality of content requests, a plurality of different DCAS codes corresponding to the plurality of encrypted contents respectively, and a single encryption key corresponding to all of the plurality of encrypted contents may be used.

When the encryption key is stored in the mobile terminal 140 through the authentication of the mobile terminal 140 that has been described above with reference to FIG. 4, the stored encryption key may be continuously used to decrypt each of encrypted contents that are transmitted after storing the encryption. The DCAS unit 210 may generate a new DCAS code every time each of a plurality of content requests is received. The DCAS unit 210 may transmit the new DCAS code to the mobile terminal 140. The mobile terminal 140 may use the same encryption key to decrypt each of different encrypted contents. The mobile terminal 140 may use different DCAS codes to decrypt each of encrypted contents. Different DCAS codes may be used to decrypt different encrypted contents, and accordingly security for each of contents may be further enhanced.

The units described herein may be implemented using hardware components, software components, or a combination thereof. For example, a processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such as parallel processors.

The software may include a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable recording mediums.

The computer readable recording medium may include any data storage device that can store data which can be thereafter read by a computer system or processing device. Examples of the computer readable recording medium include read-only memory (ROM), random-access memory (RAM), CD-ROMs, magnetic tapes, floppy disks, optical data storage devices. Also, functional programs, codes, and code segments for accomplishing the example embodiments disclosed herein can be easily construed by programmers skilled in the art to which the embodiments pertain based on and using the flow diagrams and block diagrams of the figures and their corresponding descriptions as provided herein.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

The invention claimed is:

1. A method by which a service providing apparatus provides content to a mobile terminal, the method comprising:
   receiving a user authentication request from the mobile terminal;
   transmitting the user authentication request to an authentication server;
   receiving, from the authentication server, user authentication information as a response to the user authentication request;
   generating a mobile certificate and an encryption key based on the user authentication information;
   transmitting, to the mobile terminal, the mobile certificate and the encryption key;
   receiving, from the mobile terminal, the mobile certificate and a content request;
   generating a Downloadable Conditional Access System (DCAS) code, based on the mobile certificate;
   transmitting the DCAS code to the mobile terminal; and
   transmitting, to the mobile terminal, encrypted content corresponding to the content request,
   wherein the encrypted content is decrypted by the encryption key and the DCAS code, and
   wherein the authentication server is operated by a Trusted Third Party (TTP), instead of an operator of the service providing apparatus.

2. The method of claim 1, wherein the encrypted content comprises Internet Protocol Television (IPTV) content, and is transmitted to the mobile terminal, and wherein the service providing apparatus comprises an IPTV server.

3. The method of claim 1, wherein the encrypted content is transmitted to the mobile terminal, through real-time streaming.

4. The method of claim 1, further comprising:
   transmitting the content request to a content server;
   receiving, from the content server, content corresponding to the content request; and
   encrypting the content and generating the encrypted content.

5. The method of claim 4, further comprising:
   searching for the content server that stores the content, from among a plurality of content servers.

6. The method of claim 1, wherein the receiving of the mobile certificate and the content request, the generating of the DCAS code, the transmitting of the DCAS code to the mobile terminal, and the transmitting of the encrypted content to the mobile terminal are performed for each of a plurality of content requests.

7. The method of claim 6, wherein a plurality of encrypted contents respectively corresponding to the plurality of content requests are decrypted using a plurality of different DCAS codes corresponding to each of the plurality of encrypted contents, and a single encryption key corresponding to all of the plurality of encrypted contents.

8. A service providing device, comprising:
   memory configured to store instructions;
   a processor, configured to execute the instructions stored in memory, wherein the instructions cause the device to:
   receive a user authentication request from the mobile terminal,
   transmit the user authentication request to an authentication server,
   receive, from the authentication server, user authentication information as a response to the user authentication request,
   generate a mobile certificate and an encryption key based on the user authentication information,
   transmit, to a mobile terminal, the mobile certificate and the encryption key,
   receive, from the mobile terminal, the mobile certificate and a content request,
   generate Downloadable Conditional Access System (DCAS) code based on the mobile certificate,
   transmit the DCAS code to the mobile terminal; and
   transmit, to the mobile terminal, encrypted content corresponding to the content request,
   wherein the encrypted content is decrypted by the encryption key and the DCAS code, and
   wherein the authentication server is operated by a Trusted Third Party (TTP), instead of an operator of the service providing apparatus.

9. The service providing device of claim 8, wherein the encrypted content comprises Internet Protocol Television (IPTV) content, and is transmitted to the mobile terminal, and wherein the service providing apparatus comprises an IPTV server.

10. The service providing device of claim 8, wherein the encrypted content is transmitted to the mobile terminal, through real-time streaming.

11. The service providing device of claim 8, wherein the instructions stored in memory further cause the device to:
    transmit the content request to a content server,
    wherein the processor receives, from the content server, content corresponding to the content request, and the instructions stored in memory cause the device to encrypt the content and generate the encrypted content.

12. The service providing device of claim 11, wherein the instructions stored in memory further cause the device to search for the content server that stores the content, from among a plurality of content servers.

13. The service providing device of claim 8, wherein, for each of a plurality of content requests, the processor receives the mobile certificate and the content request, and the instructions stored in memory cause the device to generate the DCAS code and transmit the DCAS code to the mobile terminal, and wherein the instructions stored in memory further cause the device to transmit the encrypted content to the mobile terminal, for each of the plurality of content requests.

14. The service providing device of claim 13, wherein a plurality of encrypted contents respectively corresponding to the plurality of content requests are decrypted using a plurality of different DCAS codes corresponding to each of the plurality of encrypted contents, and a single encryption key corresponding to all of the plurality of encrypted contents.

* * * * *